May 1, 1962 F. W. MARTIN 3,031,884
LEAK TEST EQUIPMENT
Filed July 2, 1956 2 Sheets-Sheet 1
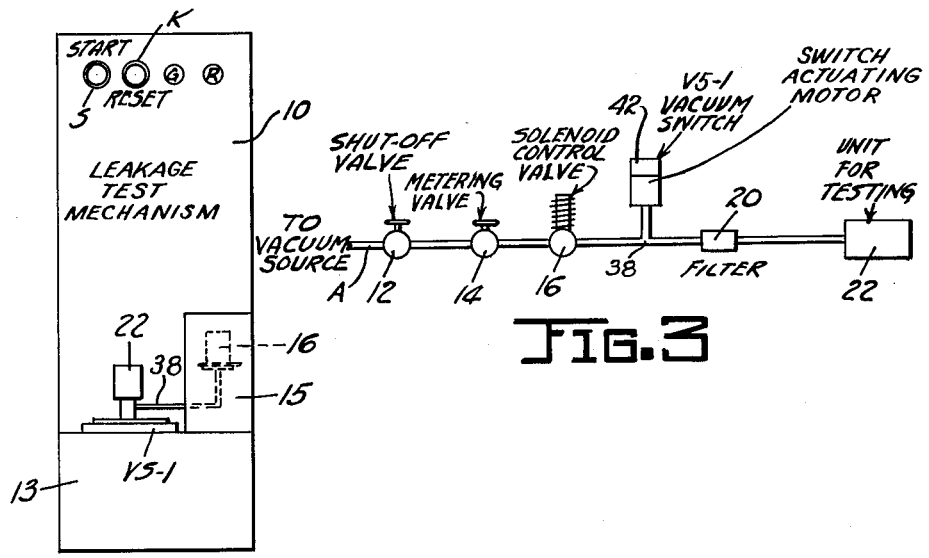
FIG.1
FIG.3
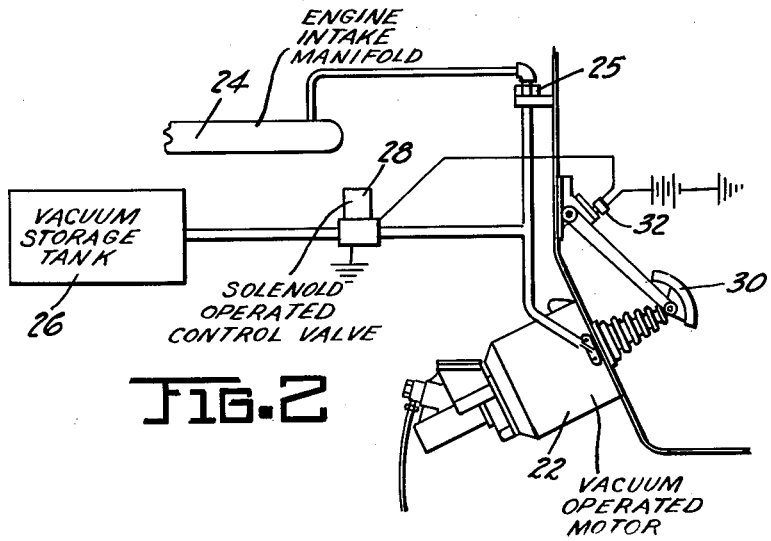
FIG.2
INVENTOR.
FREDERICK W. MARTIN
BY H. V. Clayton
ATTORNEY May 1, 1962 F. W. MARTIN 3,031,884
LEAK TEST EQUIPMENT
Filed July 2, 1956 2 Sheets-Sheet 2

INVENTOR.
FREDERICK W. MARTIN
BY H. O. Clayton
ATTORNEY 3,031,884
LEAK TEST EQUIPMENT
Frederick W. Martin, South Bend, Ind., assignor to The
Bendix Corporation, a corporation of Delaware
Filed July 2, 1956, Ser. No. 595,284
7 Claims. (Cl. 73—40)

This invention relates in general to testing mechanism and in particular to an electropneumatic mechanism for determining the relative effectiveness of any one of the principal parts of a vacuum operated mechanism such as the vacuum operated brake mechanism of an automotive vehicle.

It is of course desirable that there be no leakage of atmospheric air into the several units of a vacuum operated mechanism after said units are partially evacuated. For example, if there is an atmospheric leak in the vacuum reservoir of an automotive truck vacuum brake mechanism then in all probability this mechanism will fail to properly hold the brakes of the vehicle applied when said vehicle is standing in the garage overnight.

It is accordingly an object of my invention to provide a relatively simple so-called vacuum leakage test stand mechanism for quickly, and with a minimum of physical and mental effort on the part of the attendant, subjecting a part of a vacuum mechanism to test, to either accept or reject said part for use.

It is a further object of my invention to provide a simple and easily serviced electropneumatic test mechanism, including electrically interconnected time delay and pressure differential operated switch mechanism, for determining the effectiveness of a vacuum operated unit such as a vacuum operated motor or a vacuum operated check valve.

Other objects of the invention and desirable details of construction of parts will become apparent from the following detailed description of an illustrative embodiment of the invention, taken in conjunction with the accompanying drawings illustrating said embodiment, in which:

FIGURE 1 is a front elevational view of the vacuum leakage test stand mechanism of my invention;

FIGURE 2 is a diagrammatic view disclosing an automotive vehicle brake mechanism such as the type referred to above; and any one of the principal elements of this mechanism may be tested in the mechanism of my invention;

FIGURE 3 is a schematic view disclosing the principal elements of the test stand mechanism of my invention;

Figure 4:
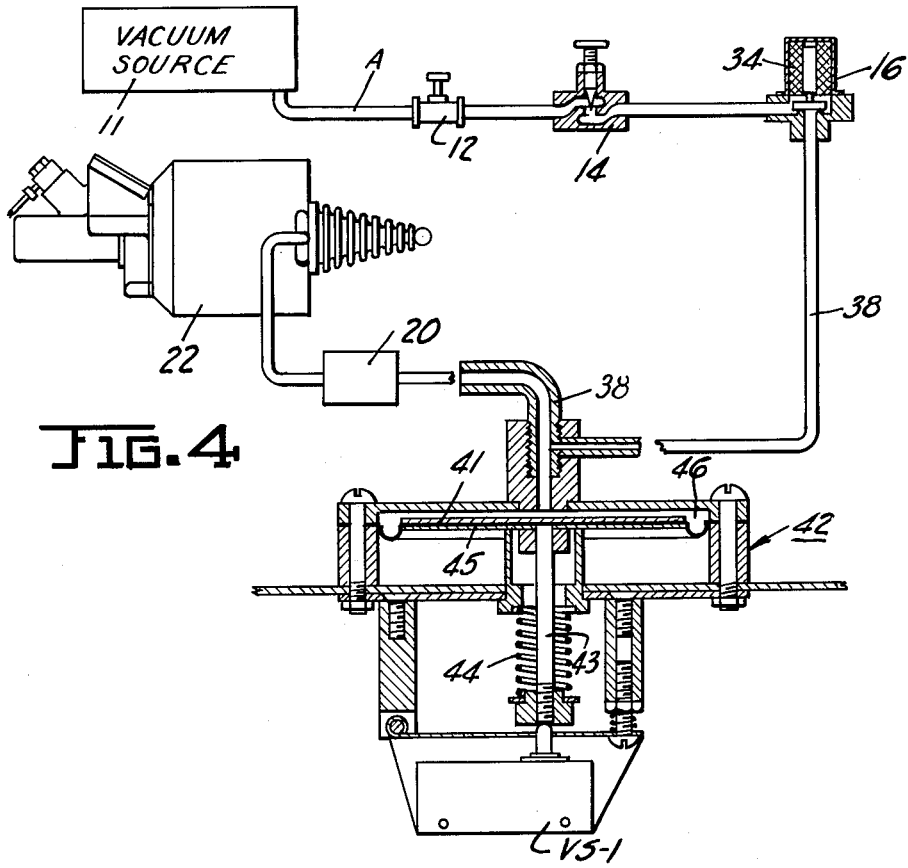
FIGURE 4 is a view, similar in general to FIGURE 3, disclosing details of three of the elements going to make up the test mechanism of my invention.

There is disclosed in the several figures of the drawings a preferred embodiment of my invention. In FIGURE 1 there is disclosed a suitable boxlike structure 10 serving as a housing and support for the elements of the vacuum leakage test mechanism constituting my invention. Referring to FIGURES 1, 3 and 4, these elements include, in series with a source of vacuum 11 and with each other, a normally open shutoff valve 12, a vacuum metering valve 14, a solenoid operated control valve 16, a vacuum operated single pole double throw switch VS-1 having contacts 1, 2 and 3, a filter 20, and a vacuum operated motor 22 to be tested. In the embodiment disclosed in the drawings the latter unit is a vacuum operated motor for operating the brakes of an automotive vehicle.

Referring to FIGURE 2 of the drawings, the vacuum operated motor 22 to be tested may be employed to operate the brakes of a truck or bus and is shown with additional mechanism which controls the operation of the motor 22. This mechanism of FIGURE 2, no claim to which is made in this application, include the intake manifold 24 of the internal combustion engine of the vehicle, a check valve 25, a vacuum storage tank 26, and a solenoid operated control valve 28. Now with a bus or truck it is often desirable to apply the brakes after a period of time during which the engine has been shut off; accordingly, there being no intake manifold vacuum available at this time, it is necessary to provide a vacuum storage tank as a source of vacuum. With the mechanism of FIGURE 2, depression of a brake pedal 30 serves to close a switch 32 thereby energizing a solenoid, not shown, to open the valve 28; and with this operation the vacuum operated motor 22 is connected to the vacuum tank 26 to apply the brakes. Now it is obviously necessary that the elements of this brake mechanism be free of a so-called vacuum leak; accordingly, I have selected one of the principal elements of said mechanism, that is the vacuum operated motor 22, to be subjected to test in the mechanism of my invention disclosed in this application.

Referring again to FIGURE 1, this figure diagrammatically discloses but three of the aforementioned series connected elements of the test mechanism, that is the vacuum operated switch VS-1, the vacuum operated motor 22 being tested, and the solenoid operated control valve 16. The remainder of the elements of the test mechanism are connected in series with the valve 16; however, these elements are not disclosed in FIGURE 1; nor are the electrical controls disclosed in this figure. FIGURE 1 also discloses a part of the hereinafter described electrical controls including a normally open starter switch S, a normally closed reset switch K, a red electric lamp R, and a green electric lamp G. The switch VS-1 and vacuum operated motor 22 connected thereto may be mounted on a platform 13, and the valve 16 and remainder of the controls are preferably housed within a housing unit 15.

There will be described now the electrical controls of the test mechanism of my invention, said controls constituting the heart of my invention. Now it is to be noted that my test mechanism is capable of performing three different operations to advise the attendant that the unit being tested is either acceptable or unacceptable for use. If the vacuum operated motor 22 being tested is acceptable the green lamp G is energized; and if said unit is unacceptable the red lamp is energized. Two of the three different operations of the test mechanism result in the energization of the red lamp; and the remaining operation of said mechanism results in the energization of the green lamp.

Describing now one of the aforementioned three operations, that is an operation resulting in the red lamp being energized, it will be assumed that the attendant assembles the mechanism as disclosed in FIGURES 1, 3 and 4 the vacuum operated motor 22 to be tested being connected to a conduit 38 leading to valve 16 and the vacuum metering valve 14 being set to effect the desired rate of evacuation of the vacuum operated motor 22 in relation to the operation of the other parts of the mechanism, particularly the solenoid valve 16 and a so-called first time delay relay TD-1 described hereinafter. No claim is made to the details of the vacuum operated motor 22, the cut-off valve 12, the metering valve 14, and the solenoid operated valve 16; accordingly, these well known units will not be described in particular detail; for their operation, with an examination of FIGURE 4, will be obvious to one skilled in this art.

Figure 5:
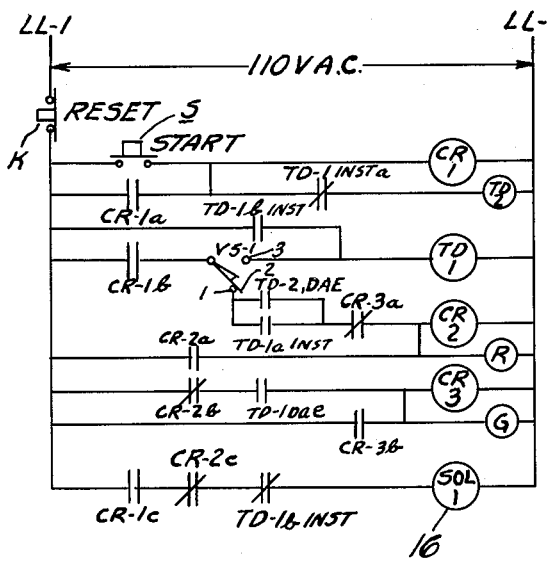
FIGURE 5 discloses the electrical hookup of the electrical controls of my invention.

The attendant will then, after the aforementioned assembly operation, close the starter switch S, FIGURE 5, whereupon the coil of a relay CR–1 is energized; and this operation results in said relay being locked into the circuit by means of the closing of a switch CR–1a, that is one of its switches; and this also results in the closing of a normally open switch CR–1c of said relay. Now the latter switch is in series with a normally closed switch CR–2c, a normally closed so-called instant switch TD–1b of the aforementioned time delay relay TD–1, and the coil of a solenoid 34, FIGURE 4, of the solenoid valve 16. Accordingly, when the starter switch S is closed the valve of the unit 16 is opened to interconnect the source of vacuum 11 with the vacuum operated motor 22; and as will be noted from an inspection of FIGURE 4, this vacuum source is interconnected with the unit 16 by means of conduit A which has incorporated therein the normally open cut-off valve 12 and the metering valve 14; and the unit 16 is interconnected with the vacuum operated motor 22 by means of conduit 38 which contains filter 20.

No claim is made to switch VS–1 and its operating mechanism; accordingly, suffice to say that a fluid pressure motor 42 connected to the conduit 38 serves, when energized, to overcome a spring 44 which, when expanded, overcomes the spring, not shown, of the switch VS–1. The latter spring serves to bias the switch to one of its operative positions, that is the position with the contacts 1 and 2 in engagement with each other. It follows, therefore, that when the motor 42 is energized the spring 44 is compressed resulting in one of the two closure operations of the switch VS–1 the contacts 2 and 3 being then in engagement. A diaphragm or power element 41 of the motor 42 is, with an energization of the motor, subjected to a differential of pressures to move a valve operating stem 43 upwardly. One side 45 of the diaphragm 41 is subject to the pressure of the atmosphere and the other side is subjected to the gaseous pressure of the air within a chamber 46 which is, with an operation of the control valve 16, connected with the source of vacuum 11. As will be noted from an inspection of FIGURE 5, the closing of the starter switch S also results in an energization of a time delay relay TD–2 and the closing of a normally open switch CR–1a of the relay CR–1. The time delay relay TD–2 is electrically connected to the starter switch system by wiring having incorporated therein a normally closed instant switch TD–1a of the time delay relay TD–1. The relays TD–1 and TD–2 are defined as first and second time delay relays, respectively, in the appended claims.

The red lamp R is electrically connected to the switch VS–1 by a normally closed switch CR–3a of a relay CR–3 and a normally open instant switch TD–1a of the time delay relay TD–1, said instant switch being in parallel with a normally open switch TD–2DAE of the time delay relay TD–2. The red lamp R is, with the energization of a so-called reject relay CR–2, locked in by a normally open switch CR–2a of the latter relay.

Completing the description of the electrical controls of my invention, a so-called passing relay CR–3 is controlled by the operation of a normally closed switch CR–2b of the relay CR–2 and a normally open switch TD–1DAE of the time delay relay TD–1; and the coil of the relay CR–3 is, after being energized, locked in by a normally open switch CR–3b of the latter relay. The time delay relay TD–1 may be locked in, around the switches CR–1b and VS–1, by the closing of a normally open instant switch TD–1b of the relay TD–1. The timer relays TD–1 and TD–2, which may for example be of any of the well known pneumatic types, close certain of their switches after the delay of a certain period of time; accordingly, said switches are indicated by the letters "DAE" meaning delay after energizing. The remaining switches of said timer relays close immediately after the relays are energized and are defined in this specification as instant switches.

Continuing with the description of the test operation being described, it is to be remembered that the attendant has closed the starter switch S thereby energizing the relays CR–1 and TD–2; and this operation results in a closing of the line up to the switch VS–1, an energization of the solenoid 34 to open the vacuum valve 16, and an energization of the timer relay TD–2. It will be assumed now that the vacuum operated motor 22 under test leaks rather badly and that said leak is sufficient to prevent the vacuum in the chamber 46 of the motor 42 from building up to the point that the switch VS–1 is moved to close its contacts 2, 3 before the relay TD–2 times out. In other words, in this case the switch TD–2DAE closes before the switch VS–1 is so closed resulting in the lighting of the red lamp R and an energization of the reject relay CR–2. Said relay, by its energization, locks itself into the circuit by means of its normally open switch CR–2a, de-energizes the solenoid 34 to close the valve 16, and opens its switch CR–2b so that the passing relay CR–3 cannot thereafter become energized. Accordingly, by this particular test operation the red lamp remains lit and the green lamp is temporarily disabled. The attendant will then, of course, reject the particular unit 22 being tested.

There will now be described another of the three tests, that is the test of a vacuum operated motor 22 which does not leak as badly as the motor tested in the aforementioned operation but nevertheless sufficiently to indicate that the same should be rejected. In this operation the attendant will, after connecting the vacuum operated motor 22 to the conduit 38, close the starter switch S. In this particular testing operation the leak in the vacuum operated motor 22 is not sufficient to prevent an upward closing operation of the contacts 2, 3 of the switch VS–1 before the timer switch TD–2 times out. The closing of the contacts 2, 3 of the switch VS–1 results in the energization of the time delay relay TD–1 and said relay is immediately locked in by the closure of its normally open instant switch TD–1b. The closure of the VS–1 switch 2, 3 also de-energizes both the timer TD–2 and the solenoid 34 by opening the normally closed instant switches TD–1a and TD–1b. Subsequently, as the vacuum operated motor 22 under test leaks down, the switch VS–1 will return to its normal position, that is with the contacts 1, 2 closed; and this operation results in an energization of the relay CR–2 and an energization of the red lamp R. The switch CR–2 is then locked into the circuit by the closing of the switch CR–2a; the switch CR–2b is opened thus preventing the passing relay CR–3 from being energized when the timer TD–1 times out. The end result of this second test is to energize the red lamp R thereby indicating to the attendant that the vacuum operated motor 22 under test is to be rejected.

Describing the third test operation, the vacuum operated motor 22 having been placed in position in the test stand, the attendant closes the starter switch S to again initiate the cycle of operations. In this case it will be assumed that the vacuum operated motor 22 undergoing test leaks some but not sufficiently to prevent a closing of the contacts 2, 3 of the switch VS–1 and their remaining closed. In this operation, as will be noted from an inspection of the electrical circuitry of FIGURE 5, the closing and locking in of the switch VS–1 contacts 2, 3 results in an energization of the timer relay TD–1; and said relay then times out thereby closing the timer switch TD–1DAE. The relay CR–3 is then energized and locked in thereby lighting the green lamp G and opening the switch CR–3a. The latter operation prevents the reject relay CR–2 from operating when the vacuum operated motor 22 being tested is removed from the test stand. The attendant, having noted that the vacuum operated motor 22 has passed its test, will remove said motor from the test stand.

It is to be noted from an inspection of the circuitry of FIGURE 5 that the test stand will, after the above described three tests, hold its information, that is keep the red or green lamps energized until the attendant opens the reset switch K; and this operation results in a de-energization of the then lighted lamp whether it be red or green. It will be understood that the reset switch K is a conventional spring loaded switch which, wired as shown in the electric circuit of FIGURE 5, is operative when open to de-energize the electrical circuitry of FIGURE 5 whereupon the starter switch S is caused to open. As to the three tests, with one the normally closed switch 1, 2 of the switch VS–1 remains closed; with the second of the tests described, the switch 2, 3 closes momentarily and the switch 1, 2 is then returned to its closed position; and with the last of the above described three tests, the switch 2, 3 is closed and stays closed. The attendant may also at any time cut off the entire test mechanism by closing the vacuum cut-off valve 12. It is also to be noted that the rate of air leakage into the known volume of the fluid portion of the mechanism and the timing of operation of the timer switches TD–1 and TD–2 in a large measure determine the result of the test being conducted.

There is thus provided, by the test mechanism of my invention, a compact and easily serviced mechanism for determining the usefulness of the elements of a vacuum operated mechanism such as the elements of a vacuum brake mechanism of an automotive vehicle.

While the preferred embodiment of the invention has been described in considerable detail, I do not wish to be limited to the particular construction shown which may be varied within the scope of the invention, and it is the intention to cover hereby all adaptations, modifications and arrangements thereof which come within the practice of those skilled in the art to which the invention relates.

I claim:

1. An electropneumatic test mechanism for determining the relative degree of leakage of a unit adapted for use in a vacuum operated mechanism, said test mechanism, comprising, in series, a source of vacuum, a solenoid operated motor controlling valve and a fluid pressure motor adapted to be connected to the unit to be tested, said test mechanism further comprising a red electric lamp, a green electric lamp, and electrical means for controlling the operation of said lamps and valve to determine whether or not the unit being tested is acceptable or unacceptable, said electrical means including a source of electrical energy, first and second electrical circuits connected to energize said red and green lamps, respectively, a starter switch in series with said first and second electrical circuits and operative when closed to communicate the same with said source, and a switch operatively connected to said first and second electrical circuits for controlling the energization of one or the other of said first and second electrical circuits, said last named switch being operated by the motor and having three different operations in the operation of the test mechanism, two of the same being reject operations and one being an accept operation, said first and second electrical circuits being automatic in operation once said starter switch is closed.

2. An electropneumatic test mechanism for determining the relative degree of leakage of a unit adapted for use in a vacuum operated mechanism, said test mechanism comprising, in series, a source of vacuum, a solenoid operated motor controlling valve and a fluid pressure motor adapted to be connected to the unit to be tested, said test mechanism further comprising a red electric lamp, a green electric lamp, and electrical means for controlling the operation of said lamps and valve to determine whether or not the unit being tested is acceptable or unacceptable, said electrical means including a source of electrical energy, first and second electrical units connected to energize said red and green lamps, respectively, a control switch operative when closed to communicate said first and second electrical circuits with said source, time delay switching means operatively connected to said first and second electrical circuits for automatically controlling the energization and de-energization of said first and second electrical circuits once said control switch is closed, and a single pole double throw switch operatively connected to said first and second electrical circuits and operated by the motor, said single pole double throw switch having three different operations in the operation of the test mechanism, one of said operations resulting in the second electrical circuit being energized and being effected when the latter switch is in one of its two operative positions.

3. An electropneumatic test mechanism for determining the relative degree of leakage of a unit adapted for use in a vacuum operated mechanism, said test mechanism comprising, in series, a vacuum control metering valve, a source of vacuum, a solenoid operated motor controlling valve and a fluid pressure motor adapted to be connected to the unit to be tested, said test mechanism further comprising a red electric lamp, a green electric lamp, and electrical means cooperating with the metering valve to control the operation of said lamps and valve to determine whether or not the unit being tested is acceptable or unacceptable, said electrical means including a source of electrical energy, a control switch wired in series with said red and green lamps and operative when closed to communicate said source with said lamps, first and second switch means wired in series with said red and green lamps, respectively, first and second time delay relay means operatively connected to said first and second switch means, respectively, for controlling the operation thereof, and a single pole double throw switch operatively connected to said first and second time delay relay means and operated by the motor, said single pole double throw switch having three different operations in the operation of the test mechanism, one of said operations resulting in the second time delay switching means being energized to thereby effect closing of said second switch means and subsequent energization of said green lamp, said operation being effected when the switch is in one of its two operative positions.

4. An electropneumatic test mechanism for determining the relative degree of leakage of a unit adapted for use in a vacuum operated mechanism, said test mechanism comprising, in series, a vacuum control metering valve, a source of vacuum, a solenoid operated motor controlling valve and a fluid pressure motor adapted to be connected to the unit to be tested, said test mechanism further comprising a red electric lamp, a green electric lamp, and electrical means cooperating with the metering valve to control the operation of said lamps and valve to determine whether or not the unit being tested is acceptable or unacceptable, said electrical means including a source of electrical energy, a control switch operative when closed to energize said electrical means, and a single pole double throw switch wired in series with said control switch and operated by the motor, said single pole double throw switch having three different operations in the operation of the test mechanism, one of said operations resulting in the green light being energized and being effected when the latter switch is one of its two operative positions, and the other two operations resulting in the red lamp being energized and being effected when the switch is in the other of its two operative positions.

5. The combination with a unit adapted to be used as a part of mechanism employing a partially evacuated reservoir as a source of power, of a test mechanism for determining the effectiveness of said unit by determining the relative degree of air leakage into said unit, said test mechanism including a green electric lamp, a red electric lamp, a source of subatmospheric pressure, a fluid pressure motor, a control valve for said motor, fluid transmitting means interconnecting the unit, the motor, the valve and said pressure source, and electrical means operatively connected to said green and red electric lamps for energizing one or the other of the same, said electrical means comprising a single pole double throw switch biased to one of two operative positions, means interconnecting said switch and the power element of said motor, said switch having three different operations depending upon the operation of the motor, a solenoid, means interconnecting said solenoid and valve, a starter switch, and control means interconnecting the starter switch, the motor operated switch, the solenoid and the two electric lamps, said control means comprising a first time delay relay operative, after a closure of the starter switch and with the cooperation of the electrical means, to energize the red lamp when the single pole double throw switch is in one of its operative positions, together with a second time delay relay which is, by the aforementioned operation of the first time delay relay, rendered temporarily inoperative.

6. The combination with a unit adapted to be used as a part of mechanism employing a partially evacuated reservoir as a source of power, of a test mechanism for determining the effectiveness of said unit by determining the relative degree of air leakage into said unit, said test mechanism including a green electric lamp, a red electric lamp, a source of subatmospheric pressure, a fluid pressure operated motor, a control valve for said motor, fluid transmitting means interconnecting the unit, the motor, the valve and said pressure source, and electrical means for energizing one or the other of said electric lamps and controlling the operation of the valve, said electrical means comprising a single pole double throw switch having three different operations depending upon the operation of the motor, means interconnecting said switch and the power element of said motor, a solenoid, means interconnecting said solenoid and valve, a starter switch, and control means interconnecting the starter switch, the motor operated switch, the solenoid and the two lamps, said control means including a plurality of electrically interlocked relays and switches actuated by the relays, said relays being energized in response to closing of said starter switch, and a plurality of electrically interlocked time delay relays and switches actuated by the time relays operatively connected to said motor operated switch and said plurality of relays and switches for controlling the energization of said red and green lamps in response to energization of said plurality of relays and the position of said motor operated switch, said motor operated switch having two positions one of which in cooperation with certain of said plurality of relays and time delay relays and associataed switches effects energization of said green lamp to indicate satisfactory operation of the unit being tested and the other of which in cooperation with certain of said plurality of relays and time delay relays and switches associated therewith effects energization of said red lamp to indicate unsatisfactory operation of said unit being tested according to the relative degree of leakage of said unit.

7. The combination with a unit adapted to be used as a part of mechanism employing a partially evacuated reservoir as a source of power, of a test mechanism for determining the effectiveness of said unit by determining the relative degree of air leakage into said unit, said test mechanism including a green electric lamp, a red electric lamp, a source of subatmospheric pressure, a fluid pressure operated motor, a control valve for said motor, fluid transmitting means interconnecting the unit, the motor, the valve and said pressure source, and electrical means for energizing one or the other of said electric lamps and controlling the operation of the valve, said electrical means comprising a single pole double throw switch having three different operations depending upon the operation of the motor, means interconnecting said switch and the power element of said motor, a solenoid, means interconnecting said solenoid and valve, a starter switch, and control means interconnecting the starter switch, the motor operated switch, the solenoid and the two lamps, said control means comprising a relay including a coil controlled by the starter switch and a plurality of switches, a relay including a coil and a plurality of switches for controlling the red lamp, a relay including a coil and a plurality of switches for controlling the green lamp, a first time delay relay including a coil and a plurality of switches, and a second time delay relay including a coil and a plurality of switches, said coils and switches being so electrically interlocked that with a closure of the starter operated switch and motor operated switch one or the other of the lamps is energized depending upon the particular operation of the motor operated switch.

References Cited in the file of this patent
UNITED STATES PATENTS

| | | |
|---|---|---|
| 2,472,973 | Hoffman et al. | June 14, 1949 |
| 2,573,053 | Pearlman | Oct. 30, 1951 |
| 2,647,456 | Allere et al. | Aug. 4, 1953 |
| 2,706,398 | Davidson | Apr. 19, 1955 |

OTHER REFERENCES

Publication, "A Fast Accurate Method For Detecting Leaks," by L. E. Sterns, Automotive Industries, September 1952, pages 53–56, 86.